(12) United States Patent
Chizuwa

(10) Patent No.: US 11,904,711 B2
(45) Date of Patent: *Feb. 20, 2024

(54) CHARGING APPARATUS

(71) Applicant: Panasonic Intellectual Property Management Co., Ltd., Osaka (JP)

(72) Inventor: Shuhei Chizuwa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/191,159

(22) Filed: Mar. 28, 2023

(65) Prior Publication Data

US 2023/0234454 A1 Jul. 27, 2023

Related U.S. Application Data

(63) Continuation of application No. 17/140,517, filed on Jan. 4, 2021, now Pat. No. 11,623,531, which is a
(Continued)

(30) Foreign Application Priority Data

Jun. 11, 2013 (JP) .................... 2013-122988

(51) Int. Cl.
*B60L 53/10* (2019.01)
*B60L 53/14* (2019.01)
(Continued)

(52) U.S. Cl.
CPC ............. *B60L 53/11* (2019.02); *B60L 53/14* (2019.02); *B60L 58/10* (2019.02); *H02J 7/00* (2013.01);
(Continued)

(58) Field of Classification Search
CPC ........................................ B60L 53/11
(Continued)

(56) References Cited

U.S. PATENT DOCUMENTS 5,341,083 A * 8/1994 Klontz ................ H02J 7/0042
320/109
5,563,491 A * 10/1996 Tseng .................... B60L 53/64
320/109
(Continued)

FOREIGN PATENT DOCUMENTS

CN 103129364 A 6/2013
JP 2000-004542 A 1/2000
(Continued)

OTHER PUBLICATIONS

English Translation of a Notice of Termination of Reconsideration by Examiners Before Appeal proceedings of Japanese Patent Application 2018-096386 dated Feb. 4, 2020.
(Continued)

*Primary Examiner* — Yalkew Fantu
(74) *Attorney, Agent, or Firm* — Pearne & Gordon LLP

(57) ABSTRACT

Provided are a charging device and a vehicle capable of reducing the amount of noise flowing into a quick-charging facility. The pair of charging lines connecting the quick-charging facility (20) to an onboard battery (30) are referred to as quick-charging lines, and each of these quick-charging lines is provided with a relay (16-1, 16-2). Each relay (16-1, 16-2) is used to switch the current flowing in the respective quick-charging line on and off, the current being switched on during quick-charge and being switched off during normal charging. Each quick-charging line has a Y-capacitor (17) connected thereto closer to a QC port (15) than the respective relay (16-1, 16-2).

19 Claims, 1 Drawing Sheet

Related U.S. Application Data continuation of application No. 16/837,528, filed on Apr. 1, 2020, now Pat. No. 10,906,412, which is a continuation of application No. 16/401,505, filed on May 2, 2019, now Pat. No. 10,640,007, which is a continuation of application No. 16/050,365, filed on Jul. 31, 2018, now Pat. No. 10,322,639, which is a continuation of application No. 14/897,087, filed as application No. PCT/JP2014/003098 on Jun. 10, 2014, now Pat. No. 10,065,522.

(51) Int. Cl.
    *B60L 58/10* (2019.01)
    *H02J 7/00* (2006.01)
    *H02J 7/02* (2016.01)

(52) U.S. Cl.
    CPC .............. *H02J 7/0042* (2013.01); *H02J 7/02* (2013.01); *B60L 2270/147* (2013.01); *H02J 2207/20* (2020.01); *Y02T 10/70* (2013.01); *Y02T 10/7072* (2013.01); *Y02T 90/12* (2013.01); *Y02T 90/14* (2013.01)

(58) Field of Classification Search
    USPC ......................................................... 320/109
    See application file for complete search history.

(56) References Cited

U.S. PATENT DOCUMENTS

| | | | |
|---|---|---|---|
| 8,513,920 B2 | 8/2013 | Scaldaferri et al. | |
| 10,065,522 B2 | 9/2018 | Chizuwa | |
| 10,906,412 B2* | 2/2021 | Chizuwa | H02J 7/0042 |
| 11,623,531 B2* | 4/2023 | Chizuwa | H02J 7/00 |
| | | | 320/109 |
| 2001/0040410 A1 | 11/2001 | Akiba | |
| 2010/0241299 A1* | 9/2010 | Ito | B60L 53/18 |
| | | | 320/109 |
| 2011/0094075 A1 | 4/2011 | Lee et al. | |
| 2014/0217956 A1 | 8/2014 | Kinomura et al. | |
| 2016/0129795 A1 | 5/2016 | Chizuwa | |
| 2016/0250939 A1* | 9/2016 | Shin | B60L 53/305 |
| | | | 320/109 |

FOREIGN PATENT DOCUMENTS

| | | |
|---|---|---|
| JP | 2005-161940 A | 6/2005 |
| JP | 2009-240016 A | 10/2009 |
| JP | 2010-004674 A | 1/2010 |
| JP | 2010-220299 A | 9/2010 |
| JP | 2011-036117 A | 2/2011 |
| JP | 2011-091988 A | 5/2011 |
| JP | 2013-115957 A | 6/2013 |
| JP | 6372761 B2 | 7/2018 |
| KR | 1020160104349 | 9/2016 |
| WO | 2013-035178 A1 | 3/2013 |

OTHER PUBLICATIONS

English Translation of First Office action in Chinese Patent Application No. 201480032534.0 dated May 25, 2017.
English Translation of Notice of Reasons for Refusal in Japanese Patent Application No. 2018-096386 dated Feb. 26, 2019.
English Translation of Second Office action in Chinese Patent Application No. 201480032534.0 dated Jan. 15, 2018.
English Translation of Notice of Reasons for Refusal in Japanese Patent Application No. 2018-096386 dated Jul. 9, 2019.
English Translation of Third Office action in Chinese Patent Application No. 201480032534.0 dated Aug. 7, 2018.
Anonymous, "Back to Basics: What are Y-Capacitors?", Vicor PoweBlog, XP055273329 dated Jun. 5, 2013.
English Translation of Decision of Refusal in Japanese Patent Application No. 2015-522542 dated Feb. 20, 2018.
English Translation of Decision of Refusal in Japanese Patent Application No. 2018-096386 dated Oct. 23, 2019.
English Translation of Notice of Refusal in Japanese Patent Application No. 2015-522542 dated Dec. 12, 2017.
International Search Report for Application No. PCT/JP2014/003098 dated Jul. 8, 2014.
European Patent Office Action in European Patent Application No. 14 810 431.8 dated May 8, 2020.
Tech Web, "Transformer vs. Switching", https://techweb.rohm.com/knowledge/acdc/s-acdc/01-s-acdc/13; Copyright 1997-2020 ROHM Co., Ltd.
English machine translation of Notice of the Reasons for Rejection dated Aug. 25, 2020 for the corresponding Japanese Patent Application No. 2018-96396.
Japanese Office Action issued in Japanese Patent Application No. 2020-001316 dated Oct. 13, 2020.
English translation of Chinese Office Action issued in Chinese Patent Application No. 201910265053.9 dated May 30, 2022.
English translation of Chinese Office Action dated Dec. 23, 2021 issued in Chinese Patent Application No. 201910265053.9.

* cited by examiner

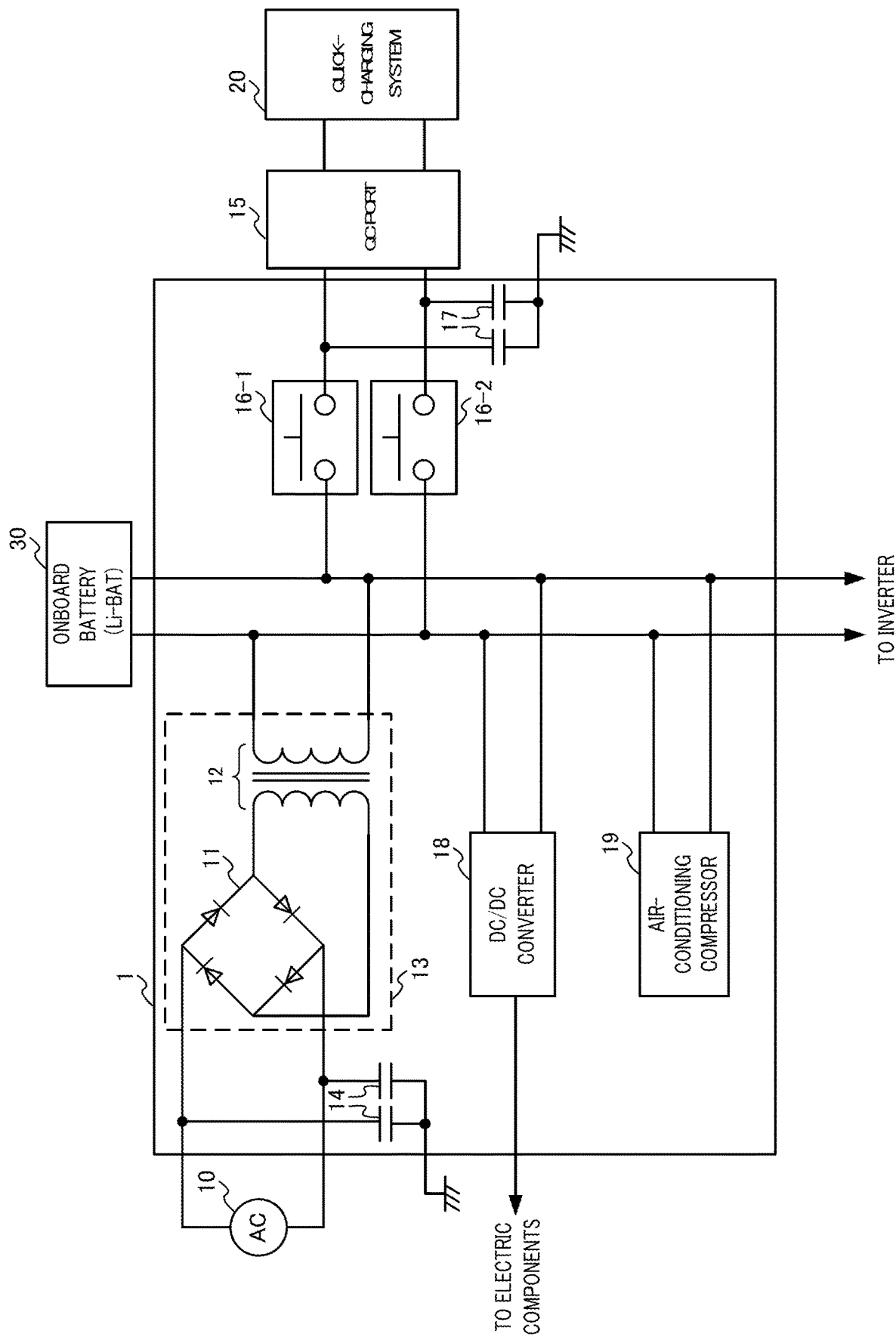

CHARGING APPARATUS

CROSS REFERENCE TO RELATED APPLICATIONS

This application is a continuation of U.S. patent application Ser. No. 17/140,517 filed on Jan. 4, 2021, which is a continuation of U.S. patent application Ser. No. 16/837,528 filed on Apr. 1, 2020, which is a continuation of U.S. patent application Ser. No. 16/401,505 filed on May 2, 2019, which is a continuation of U.S. patent application Ser. No. 16/050,365 filed on Jul. 31, 2018, which is a continuation of U.S. patent application Ser. No. 14/897,087 filed on Dec. 9, 2015, which is a national stage of PCT/JP2014/003098 filed Jun. 10, 2014, which claims the benefit of Japanese Patent Application No. 2013-122988 filed Jun. 11, 2013, each of which is incorporated herein by reference in its entirety.

TECHNICAL FIELD

The present invention relates to an onboard charging apparatus and a vehicle that are quickly charged by a quick-charging system provided outside a vehicle.

BACKGROUND ART

Recently, automobiles that run on electricity, such as an Electric Vehicle (EV), and a Plug-in Hybrid Electric Vehicle (PHEV) (hereinafter, referred to simply as "vehicles") have gradually become popular. Such vehicles are equipped with a large-capacity storage battery, and store in the storage battery electric energy charged from the outside and run using the stored electric energy As a method for supplying electric power to a vehicle storage battery from the outside, a method is available in which a charger installed in a vehicle receives the supply of alternating-current (AC) power from a 100V AC power source used in ordinary households and converts the AC power to direct-current (DC) power to charge a storage battery. This method requires a noise-eliminating device for eliminating noise, in order to prevent the inflow of noise into the AC power source. A charging apparatus having such a noise-eliminating device is disclosed, for example, in Patent Literature (hereinafter, referred to as "PTL") 1.

PTL 1 discloses a charging apparatus including a switch in an intermediate grounding conductor that connects, to the ground, a ground side terminal of a Y capacitor that eliminates noise. The switch is configured to connect and disconnect the intermediate grounding conductor, and the charging apparatus disconnects the intermediate grounding conductor by controlling the switch when a security ground terminal is not connected to the ground. Thus, this switching prevents the occurrence of a large potential difference between a vehicle body and the ground even when the intermediate ground conductor is not connected to the ground sufficiently.

Meanwhile, as a method for supplying electric power to a vehicle storage battery from the outside, another method is available in which a quick-charging system provided outside a vehicle directly supplies large DC power to a storage battery.

CITATION LIST

Patent Literature

PTL 1
Japanese Patent Application Laid-Open No. 2009-240016

SUMMARY OF INVENTION

Technical Problem

However, the quick-charging line that connects the quick-charging system to the storage battery is not provided with a noise countermeasure. Therefore, there is a problem in which, when a circuit such as a DC/DC converter that operates using the storage battery as a power source undesirably starts operating during quick charging, noise may occur from such a circuit and flow into the quick-charging system.

An object of the present invention is to provide a charging apparatus and a vehicle each reducing the amount of noise flowing into a quick-charging system.

Solution to Problem

The charging apparatus of the present invention has a configuration including: a quick-charging line having one end being connected to a line between a battery and a component which becomes a noise source when the component operates during quick charging to the battery, and having the other end being connected to an input side of quick charging; and a first noise filter that is disposed on the quick-charging line and eliminates noise.

Advantageous Effects of Invention

According to the present invention, it is possible to reduce the amount of noise flowing into a quick-charging system.

BRIEF DESCRIPTION OF DRAWINGS

FIG. 1 is a diagram illustrating a configuration of a charging apparatus according to an embodiment of the present invention.

DESCRIPTION OF EMBODIMENT

Hereinafter, an embodiment of the present invention will be described in detail with reference to the drawing.

Embodiment

<Configuration of Charging Apparatus>

FIG. 1 is a diagram illustrating a configuration of charging apparatus 1 according to an embodiment of the present invention. Hereinafter, the configuration of charging apparatus 1 will be described with the aid of FIG. 1. FIG. 1 also illustrates, in addition to charging apparatus 1, 100 V AC power source 10 used in ordinary households, quick-charging system 20 that is provided outside a vehicle and supplies large DC power (e.g., 300 V), and onboard battery 30 that is a storage battery such as a lithium-ion battery. Charging apparatus 1 is equipped on vehicles such as an EV having onboard battery 30, and charges onboard battery 30 utilizing power from AC power source 10 or quick-charging system 20.

AC/DC converter 13 including bridge circuit 11, transformer 12, and a switching circuit (not illustrated) or the like converts AC power supplied from AC power source 10 to DC power, and onboard battery 30 is charged.

A pair of charging lines connecting AC power source 10 to bridge circuit 11 is referred to as normal charging lines, and Y capacitors 14 are connected to the normal charging lines, respectively. Y capacitors 14 are grounded to the body ground at a neutral point and reduce noise that flows into AC power source 10 from AC/DC converter 13 to a certain current value or lower and causes the noise to flow to the body ground.

QC port 15 is a connector capable of detachably connecting quick-charging system 20 to charging apparatus 1.

A pair of charging lines each having one end being connected to a line that connects onboard battery 30 to DC/DC converter 18, and air conditioning compressor 19, and/or the like to be described hereinafter, and the other end being connected to QC port 15 is referred to as a quick-charging line, and the respective quick-charging lines are provided with relays 16-1 and 16-2. Relays 16-1 and 16-2 switch on and off the current flowing through the quick-charging line. Relays 16-1 and 16-2 switch the current on during quick charging, and switch the current off during normal charging.

Further, Y capacitors 17 are connected respectively to the quick-charging lines on QC port 15 side (input side of quick charging) with respect to relays 16-1 and 16-2 of the respective quick-charging lines. Y capacitor 17 is connected to the body ground at a neutral point and reduces noise from DC/DC converter 18 and air-conditioning compressor 19 to be described hereinafter to a certain current value or lower and causes the noise to flow to the body ground.

DC/DC converter 18 lowers DC power supplied from onboard battery 30 to about 14 V, for example, and supplies the power to electric components of the vehicle. Further, air-conditioning compressor 19 uses the DC power supplied from onboard battery 30 to compress a refrigerant for air conditioning. It is noted that DC/DC converter 18 and air-conditioning compressor 19 become a noise source that generates noise, when they operate during quick charging.

Onboard battery 30 is charged by AC power source 10 or quick-charging system 20, and supplies the charged power to DC/DC converter 18, air-conditioning compressor 19, and an inverter (not illustrated) or the like.

In this manner, charging apparatus 1 connects Y capacitors 17 to the quick-charging lines. Thus, even when DC/DC converter 18, and air-conditioning compressor 19, and/or the like operate during quick charging, the amount of noise flowing into quick-charging system 20 can be reduced by causing the noise generated from these circuits to flow to the body ground through Y capacitor s.

<Y capacitors for Quick Charging>

Here, Y capacitors 17 will be described.

When Y capacitors 17 are provided on onboard battery 30 side with respect to relays 16-1 and 16-2, the total electrostatic capacitance of Y capacitors 17 and Y capacitors 14 for normal charging increases, which causes a current flowing through the vehicle body to increase during normal charging, thus undesirably increasing the possibility of an electric shock.

Under such circumstances, the present invention provides Y capacitors 17 on QC port 15 side with respect to relays 16-1 and 16-2 of the quick-charging lines, as described above, to thereby prevent the inflow of noise into Y capacitors 17 during normal charging. Thus, it becomes possible to avoid the increase of the total electrostatic capacitance of the Y capacitors, thereby avoiding the possibility of an electric shock.

It is noted that, since transformer 12 is isolated during quick charging, no noise flows into Y capacitors 14. Further, there is a standard which requires that a leakage current from a Y capacitor should be 3.5 mA or lower (IEC 61851), and thus, the electrostatic capacitance of a Y capacitor needs to be 35.16 nF or lower due to this requirement.

<Effects of Embodiment>

Thus, according to the present embodiment, connecting Y capacitors 17 to the quick-charging lines that connects quick-charging system 20 to onboard battery 30 makes it possible to reduce the amount of noise flowing into quick-charging system 20 by causing the noise generated from noise sources such as DC/DC converter 18, and air-conditioning compressor 19 and/or the like to flow to the body ground through Y capacitors 17, even when these noise sources operate during quick charging.

Further, according to the present embodiment, disposing Y capacitors 17 on QC port 15 side with respect to relays 16-1 and 16-2 of the quick-charging lines makes it possible to block the noise from flowing into Y capacitors 17 during normal charging, thus avoiding the increase of the total electrostatic capacitance of the Y capacitors, to thereby avoid the possibility of an electric shock.

Note that, the description has been given with the Y capacitors each serving as a capacitor to be connected to the quick-charging line in the present embodiment, but an X capacitor, a coil, a ferrite, or the like may be used in place of the Y capacitor as a countermeasure against noise. Further, the number of Y capacitors to be connected to the quick-charging lines may be one.

In addition, the present embodiment has been described with the assumption that DC/DC converter 18 and air-conditioning compressor 19 which become noise sources that generate noise when they operate during quick charging are also included in charging apparatus 1, but these noise sources need not be included in charging apparatus 1.

The disclosure of Japanese Patent Application No. 2013-122988, filed on Jun. 11, 2013, including the specification, drawing and abstract, is incorporated herein by reference in its entirety.

INDUSTRIAL APPLICABILITY

The charging apparatus and vehicle according to the present invention are applicable to automobiles that run on electricity, such as an EV and a PHEV.

REFERENCE SIGNS LIST

1 Charging apparatus
10 AC power source
11 Bridge circuit
12 Transformer
13 AC/DC converter
14, 17 Y capacitor
15 QC port
16-1, 16-2 Relay
18 DC/DC converter
19 Air-conditioning compressor
20 Quick-charging system
30 Onboard battery

The invention claimed is:
1. A charging apparatus comprising:
a first noise filter that is coupled to a connector, the connector being configured to couple a direct-current power source to a battery, wherein the first noise filter reduces noise;
a second noise filter that is coupled to an AC/DC converter that converts alternating-current power supplied from an alternating-current power source to a direct-current power, the second noise filter being operative to reduce noise; and a relay that is disposed between the first noise filter and the battery.

2. The charging apparatus according to claim 1, further comprising:
a DC/DC converter that lowers a direct-current power supplied from the battery and supplies the lowered direct-current power to electric components, the DC/DC converter is coupled to the first noise filter.

3. The charging apparatus according to claim 1, further comprising:
an air-conditioning compressor that uses the direct-current power supplied from the battery to compress a refrigerant for air conditioning, wherein the air-conditioning compressor is coupled to the first noise filter.

4. The charging apparatus according to claim 1, wherein the second noise filter is disposed on an alternating-current power source side with respect to the AC/DC converter.

5. The charging apparatus according to claim 1, wherein the first noise filter is a Y capacitor.

6. The charging apparatus according to claim 1, wherein the second noise filter is a Y capacitor.

7. The charging apparatus according to claim 6, wherein the AC/DC converter includes a transformer.

8. A charging apparatus comprising:
a first noise filter that is coupled to a connector, the connector being configured to couple a direct-current power source to a battery, wherein the first noise filter reduces noise; and
a relay that is disposed between the first noise filter and the battery,
wherein the first noise filter includes at least one of a Y capacitor, an X capacitor, a coil, or a ferrite.

9. The charging apparatus according to claim 8, wherein the first noise filter is a Y capacitor.

10. The charging apparatus according to claim 8, wherein the first noise filter is an X capacitor.

11. The charging apparatus according to claim 8, wherein the first noise filter is a coil.

12. The charging apparatus according to claim 8, wherein the first noise filter is a ferrite.

13. A charging apparatus comprising:
a first noise filter that is coupled to a relay that switches on and off a current flow,
a connector that is configured to connect a direct-current power source to a battery,
wherein the first noise filter is disposed between the relay and the connector.

14. The charging apparatus according to claim 13, wherein the first noise filter includes at least one of a Y capacitor, an X capacitor, a coil, or a ferrite.

15. The charging apparatus according to claim 13, wherein the first noise filter is a Y capacitor.

16. The charging apparatus according to claim 13, wherein the first noise filter is an X capacitor.

17. The charging apparatus according to claim 13, wherein the first noise filter is a coil.

18. The charging apparatus according to claim 13, wherein the first noise filter is a ferrite.

19. A power transfer apparatus comprising:
a first noise filter that is coupled to a connector, the connector being configured to couple a direct-current power source to a battery, wherein the first noise filter reduces noise; and
a relay that is disposed between the first noise filter and the battery,
wherein the first noise filter includes at least one of a Y capacitor, an X capacitor, a coil, or a ferrite.

* * * * *